Patented Sept. 6, 1938

2,128,971

UNITED STATES PATENT OFFICE 2,128,971

PROCESS FOR PRODUCING BETA OLEFINS

Robert D. Snow, Bartlesville, Okla., assignor to Phillips Petroleum Company, Bartlesville, Okla., a corporation of Delaware No Drawing. Application July 29, 1935,
Serial No. 33,794

15 Claims. (Cl. 260—179)

The present invention relates to the production of secondary olefins in a concentrated form and processes for doing the same.

The object of this invention is to manufacture a product containing alpha and beta olefins in a concentrated form from mixtures of paraffins and olefins.

Another object is to obtain a concentrated secondary olefin product from such mixtures of paraffins and olefins as are obtained by dehydrogenating paraffin hydrocarbons or by pyrolysis of petroleum.

The objects of this invention are attained by first treating the mixture of hydrocarbons for the elimination or conversion of the branched chain olefins, which react very rapidly with strong sulfuric acid and which interfere with the reaction of the alpha and beta olefins with sulfur dioxide, suitably by selective polymerization catalytically or by other means, then treating the remaining mixture of paraffins and straight-chain olefins substantially freed from monomeric branched-chain olefins with a relatively more concentrated sulfuric acid which will react with the said straight-chain-olefins and convert them largely to the acid sulfate esters; separating the acid-ester layer and diluting it with a limited quantity of water; and heating the diluted acid ester, preferably with reflux, to regenerate olefins, mainly beta olefins, from the esters.

In the vapors from cracking stills, the secondary olefins are nearly always admixed with 10 to 20 per cent of tertiary olefins and 20 to 60 per cent of paraffins. Typical analyses of four- and five-carbon fractions of vapors from a liquid-phase cracking still are as follows:

| Four-carbon fraction | Per cent | Five-carbon fraction | Per cent |
|---|---|---|---|
| Isobutane | 11.4 | Pentanes (n and iso) | 53 |
| n-Butane | 49.0 | Tertiary pentenes | 16 |
| Isobutene | 10.1 | Pentene-1 | 11 |
| Butene-1 | 10.4 | Pentene-2 | 20 |
| Butene-2 | 18.2 | | |
| Butadiene | 0.9 | | 100 |
| | 100.0 | | |

I am aware that it has been proposed to prepare substantially pure beta olefins from such fractions by treating the fraction with acid of one concentration such that the tertiary or gamma olefins are polymerized and the alpha and beta olefins react simultaneously with the acid to form the acid sulfate esters which are subsequently separated from the oily layer, diluted with water, and heated to regenerate the olefins mainly as beta olefins.

I have found that if, in such a process, sulfuric acid of sufficient concentration to react with the alpha and beta olefins at a reasonably rapid rate is used, that serious losses of alpha and beta olefins are sustained by polymerization. This is apparently due to the presence of considerable quantities of the highly reactive gamma olefins, which polymerize rapidly with the evolution of much heat, thereby making temperature control difficult, and induce co-polymerization of the less reactive alpha and beta olefins. For example, 2½ pound portions of a butene-butane fraction, each containing 269 grams of isobutene and 422 grams of butenes-1 and -2, were treated with various strengths of sulfuric acid at a suitable temperature in the range 5-35° C. until the reaction had practically stopped. The same weight of sulfuric acid was used in all cases. The amount of polymer formed and the weight of straight chain butenes, mainly butene-2, regenerated by diluting and heating the acid ester layer, were determined. The results are shown in the following table:

| Acid concentration, per cent $H_2SO_4$ | Weight of polymer, grams | Weight of regenerated butenes, grams |
|---|---|---|
| 65 | 283 | 24 |
| 70 | 475 | 143 |
| 75 | 519 | 157 |
| 80 | 422 | 249 |

The 65 per cent sulfuric acid dissolved very little of the butenes-1 and -2 even on prolonged agitation. It did, however, polymerize the isobutylene practically completely. With 70 per cent sulfuric acid considerable quantities of butenes-1 and -2 were dissolved, but warming of the mixture and extended time of contact were required. These conditions led to excessive polymerization of the butenes-1 and -2. The same is true to a lesser extent for the 75 per cent sulfuric acid. With the 80 per cent sulfuric acid, it was possible to dissolve the butenes-1 and -2 rapidly at 5-15° C., and by separating and diluting the acid ester layer as soon as possible after reaction was complete, a higher yield of regenerated butenes was obtained. The loss of butenes-1 and -2 by polymerization was still excessive, however. These results also indicate the importance of the temperature and time of contact in controlling the extent of the undesirable side reaction, polymerization.

I have found that much better yields of regenerated olefins can be obtained by first treating the paraffin-olefin mixture with a more dilute acid, preferably 60-65 per cent sulfuric acid, which will polymerize the gamma olefins rapidly without extracting or polymerizing much of the alpha and beta olefins; separating the dilute acid; then treating the paraffin-olefin mixture with a quantity of a more concentrated acid, preferably 75-85 per cent, which will react rapidly with the alpha and beta olefins to form, for the most part, the acid sulfates; separating the acid ester layer and diluting it with a quantity of water sufficient to reduce the concentration of the original 75–85 per cent sulfuric acid to 50–65 per cent sulfuric acid; and then heating, preferably with reflux thereby regenerating the olefins chiefly as beta olefins.

For the first step, acid of 55–70 per cent concentration can be used, providing the temperature of operation is suitably controlled. Thus, if 60 per cent sulfuric acid is used, it will be necessary to maintain a temperature of 35–50° C. in order to obtain a sufficiently rapid polymerization of the isobutene. Acid of 65 per cent sulfuric acid concentration can be used satisfactorily in the range 20–35° C. If acid of 70 per cent sulfuric acid is used, a lower temperature, suitably 0–10° C., is required to prevent extensive extraction and polymerization of the alpha and beta olefins. It will be obvious to those skilled in the art that the concentration of the acid used in the first step can be varied over quite a range providing the temperature in the reactor and the time of contact of the olefins with the acid are suitably controlled. This step can be carried out by contacting the acid with hydrocarbons in either the gaseous or the liquid phase and as either a continuous countercurrent or a batch process.

The dilute acid containing some dissolved olefins, mainly unpolymerized, is separated and may then be regenerated in a form suitable for recycling by merely heating sufficiently to polymerize and separate the dissolved olefins.

While the above described method of eliminating the gamma olefins by selective extraction and polymerization with somewhat diluted sulfuric acid is probably the most convenient and economical way, I do not confine myself to that method. My invention lies in first eliminating most of the gamma olefins, by any suitable method, and then subsequently extracting the remaining (principally alpha and/or beta) olefins with strong sulfuric acid, suitably diluting the acid solution with water, and heating it to regenerate olefins from the acid sulfate esters. The gamma olefins may be eliminated by selective polymerization by means of solid catalysts, phosphoric acid, sulfonic acids, etc.

At this point, I can either fractionate the hydrocarbon mixture in order to remove the polymer formed in the first step before giving the second acid treatment, or subject the mixture directly to the second acid treatment.

For the second acid treatment, the concentration should be sufficiently high to give a relatively rapid reaction with the alpha and beta olefins so that substantially complete extraction will occur in a short contact time, and yet should not be sufficiently concentrated that appreciable polymerization will occur under the conditions of temperature and contact time. The acid strength can be varied over the range 70–90 per cent by weight providing the temperature and contact time are suitably controlled. Acid of 70 per cent sulfuric acid will require temperatures of 35–50° C., and 85–90 per cent sulfuric acid will require temperatures of 0–15° C. with short contact time. With ordinary means of controlling plant operation, 75–83 per cent sulfuric acid will give most favorable results. The quantity of acid should be such that the acid sulfate, rather than the neutral sulfate, predominates; i. e., the quantity of sulfuric acid should be adequate to convert at least 80 per cent of the olefins present to the acid sulfate. The acid may be contacted with the hydrocarbons in the liquid or in the vapor phase, and either continuously or in batches. However, the most satisfactory results were obtained by liquid phase treatment.

Usually the acid-ester liquid is then separated from the hydrocarbons and is diluted with water within a short time and heated to regenerate the olefins, but the dilution step may precede the separation. I am aware of the fact that if the amount of water added at this point is sufficient to reduce the concentration of the original acid used in the second acid treatment to 20 per cent sulfuric acid or less, the product of heating will be almost entirely a secondary alcohol. I have found, however, that as the proportion of diluting water is decreased there is an increasing tendency for the acid esters to regenerate a beta olefin on heating. For my process, I use a quantity of diluting water sufficient to reduce the concentration of the original acid used in the second acid treatment to 50–65 per cent sulfuric acid by weight and preferably about 55–60 per cent. When the diluted mixture is heated, the regeneration of the unpolymerized olefin begins at about 75° C. and as the reaction proceeds, the temperature of the reaction mixture will rise to about 120–145° C. at completion. Since the reaction is endothermic, heat must be supplied throughout the reaction.

The following example will further illustrate the process of the invention. 2½ pounds of a liquefied butane-butene fraction of cracking still gases containing 23.7 per cent isobutylene and 37.2 per cent of butenes-1 and -2, was contacted with 1200 g. of 65 per cent sulfuric acid at 25° C. until the polymerization of isobutylene was practically complete. The acid layer was separated, and the hydrocarbon mixture was then contacted with 1000 gm. of 80 per cent (by weight) sulfuric acid at 15–20° C. until extraction of the olefins was substantially complete. The acid layer was then separated and diluted with 460 gm. of water. The diluted mixture was heated in a still provided with a reflux condenser. The regenerated butenes passing through the reflux condenser were then passed to a total condenser, where 350 gm. of butene-2 was recovered.

While this process has been described and illustrated mainly with reference to the production of butene-2 from a fraction containing mainly four carbon atom hydrocarbons, it can be applied equally well to fractions containing five, six or more carbon atoms per molecule and to unfractionated mixtures containing four, five, six and more carbon atoms per molecule. If it is desired to prepare a pure butene, pentene-2, or hexene-2, etc., the process may be applied to the corresponding fraction of cracking still vapors, or the process can be applied to the unfractionated mixture of hydrocarbon vapors and the beta olefins obtained may be fractionated subsequently to the desired constituents.

I claim:

1. The process of preparing beta olefins in a concentrated form from a hydrocarbon mixture containing isomeric alpha, beta and gamma olefins, which comprises first treating the said hydrocarbon mixture with a comparatively dilute acid, preferably 55–70 per cent sulphuric acid at a temperature suitable to polymerize the gamma olefins without extracting or polymerizing substantial quantities of alpha and beta olefins, separating the more dilute acid, then treating the hydrocarbon mixture with a quantity of more concentrated acid sufficient to convert at least 80 per cent of the olefins present to the acid sulphates, at a suitable temperature to extract the alpha and beta olefins, separating the acid sulphate mixture and diluting it with a quantity of water sufficient to reduce the concentration of the 75-85 per cent acid originally used to 50-65 per cent sulphuric acid and heating the diluted acid sulphate mixture to a temperature suitable to regenerate and separate the olefins mainly as beta olefins in an unpolymerized form.

2. The process of preparing beta olefins in a concentrated form from a hydrocarbon mixture containing isomeric straight-chain and gamma olefins, which comprises first treating the said hydrocarbon mixture with a comparatively more dilute acid, preferably 55-70 per cent sulphuric acid at a suitable temperature to polymerize the gamma olefins without extracting or polymerizing substantial quantities of other olefins, separating the more dilute acid, then treating the hydrocarbon mixture with a quantity of more concentrated acid sufficient to convert at least 80 per cent of the olefins present to the acid sulphates, at a suitable temperature to extract other olefins, separating the acid sulphate mixture and diluting it with a quantity of water sufficient to reduce the concentration of the more concentrated acid originally used to 50-65 per cent sulphuric acid and heating the diluted acid sulphate mixture to a temperature above 75° C. thereby to regenerate and separate the olefins mainly as beta olefins in an unpolymerized form.

3. The process of preparing beta olefins in a concentrated form from a hydrocarbon mixture containing homologous alpha, beta and gamma olefins, which comprises first treating the said hydrocarbons mixture with a comparatively dilute acid, preferably 55-70 per cent sulphuric acid at a suitable temperature to polymerize the gamma olefins without extracting or polymerizing substantial quantities of alpha and beta olefins, separating the more dilute acids, then treating the hydrocarbon mixture with a more concentrated acid, containing 70 to 90 per cent by weight of sulphuric acid, in a quantity sufficient to convert at least 80 per cent of the olefins present to the acid sulphates to extract the alpha and beta olefins, separating the acid sulphate mixture and diluting it with a quantity of water sufficient to reduce the concentration of the 70-90 per cent acid originally used to 50-65 per cent sulphuric acid and heating the diluted acid sulphate mixture to a temperature above 75° C. thereby to regenerate and separate the olefins mainly as beta olefins in an unpolymerized form.

4. The process of preparing beta olefins in a concentrated form which comprises treating hydrocarbon mixtures such as the vapors produced by cracking petroleum products, with sulphuric acid of suitable dilution, preferably 55-65 per cent sulphuric acid, to polymerize the gamma olefins selectively, separating the acid treating solution, contacting the remaining hydrocarbon mixture with stronger sulphuric acid of a concentration not in excess of 90 per cent by weight at a suitable temperature to convert most of the alpha and beta olefins to the acid sulphate esters, separating and diluting the acid sulphate solution with a quantity of water sufficient to reduce the concentration of the acid originally used in the second acid treatment to 50-65 per cent sulphuric acid, and heating the diluted acid sulphate esters at a temperature in excess of 75° C. thereby to regenerate and separate the olefins mainly as beta olefins in an unpolymerized form.

5. The process of preparing beta olefins in a concentrated form which comprises treating hydrocarbon mixtures containing gamma and other olefins for the selective polymerization of substantially all of the gamma olefins, subsequently contacting the remaining hydrocarbon mixture with sulphuric acid solution of a concentration between 70 and 90 per cent by weight at a suitable temperature to convert most of the other olefins to the acid sulphate esters, separating and diluting the acid sulphate solution with a quantity of water sufficient to reduce the concentration of the acid originally used to 50-65 per cent sulphuric acid, and heating the diluted acid sulphates to a temperature in excess of 75° C. thereby to regenerate and separate olefins.

6. The process of preparing 2-butene in a concentrated form which comprises treating hydrocarbon mixtures containing olefins consisting principally of isobutene and other butenes to selectively polymerize most of the isobutene, subsequently contacting the remaining hydrocarbons with strong sulphuric acid of approximately 70-90 per cent by weight concentration in quantity sufficient to convert most of the other butenes to the acid sulphate esters, separating the acid sulphate mixture and diluting it with a quantity of water approximately sufficient to reduce the concentration of the acid originally used to 50-65 per cent sulphuric acid, and heating the diluted acid sulphate mixture to a temperature between 75 and 145° C. thereby to regenerate and separate olefins.

7. The process of preparing 2-pentene in a concentrated form which comprises treating hydrocarbon mixtures containing olefins consisting principally of gamma pentenes and other pentenes to selectively polymerize most of the gamma pentenes, subsequently contacting the remaining hydrocarbons with strong sulphuric acid of approximately 70-90 per cent by weight concentration in quantity sufficient to convert most of the pentenes to acid sulphate esters, separating the acid sulphate mixture and diluting it with a quantity of water approximately sufficient to reduce the concentration of the acid originally used to 50-65 per cent sulphuric acid, and heating the diluted acid sulphate mixture to a temperature between 75 and 145° C thereby to regenerate and separate olefins.

8. The process of preparing 2-hexenes in a concentrated form which comprises treating hydrocarbon mixtures containing olefins consisting principally of gamma hexenes and other hexenes to selectively polymerize most of the gamma hexenes, subsequently contacting the remaining hydrocarbons with strong sulfuric acid of approximately 70-90 per cent by weight concentration in quantity sufficient to convert most of the hexenes to acid sulfate esters, separating the acid sulfate mixture and diluting it with a quantity of water approximately sufficient to reduce the concentration of the acid originally used to 50-65 per cent sulfuric acid, and heating the diluted acid sulfate mixture to a temperature between 75 and 145° C. thereby to regenerate and separate olefins.

9. The process for producing concentrates of beta olefins from a hydrocarbon mixture containing alpha, beta and gamma olefins, which comprises treating the said hydrocarbon mixture first with 55-70 per cent sulfuric acid at a suitable temperature to polymerize the gamma olefins without extracting or polymerizing substantial quantities of alpha or beta olefins, separating the hydrocarbon phase and treating it with 70-90 per cent sulfuric acid at a suitable temperature to extract the alpha and beta olefins without serious polymerization, separating the acid phase and diluting it with a quantity of water sufficient to reduce the original 70-90 per cent sulfuric acid to 50-65 per cent sulfuric acid, and heating the diluted acid extract to a temperature between 75 and 145° C. in a still provided with a reflux condenser to regenerate and separate olefins.

10. The process for producing concentrates of beta olefins from a hydrocarbon mixture containing alpha, beta, and gamma olefins, which comprises treating the said hydrocarbon mixture first with 55-70 per cent sulfuric acid at a suitable temperature to polymerize the gamma olefins, separating the hydrocarbon layer, fractionating to eliminate the olefin polymers, treating the unpolymerized hydrocarbon distillate with 70-90 per cent sulfuric acid at a suitable temperature to extract the alpha and beta olefins without serious polymerization, separating the acid extract and diluting it with a quantity of water sufficient to reduce the original 70-90 per cent sulfuric acid to 50-65 per cent sulfuric acid, and heating the diluted acid extract to a temperature between 75 and 145° C. in a still provided with a reflux condenser to return substantially all alcohol and water while passing the olefin generated.

11. A process for preparing beta olefins in a concentrated form, which comprises treating hydrocarbon mixtures containing tertiary and other olefins for the selective polymerization of substantially all of the tertiary olefins, separating an unpolymerized, olefin-containing hydrocarbon mixture from polymerized hydrocarbons so formed, contacting said unpolymerized hydrocarbon mixture with a sulfuric acid solution of a concentration between 70 and 90 per cent by weight and at a suitable temperature to convert most of the olefins in said hydrocarbon mixture to the acid sulfate esters, separating said acid sulfate solution and adding thereto a quantity of water sufficient to reduce the concentration of the acid originally used to a concentration of between 50 and 65 per cent sulfuric acid thereby diluting said acid sulfate solution, and heating said diluted acid sulfate solution to a temperature between 75 and 145° C. thereby to regenerate and separate olefins.

12. A process for preparing 2-butene in a concentrated form, which comprises subjecting a hydrocarbon mixture containing olefins consisting principally of isobutene and other butenes to a selective polymerization to selectively polymerize most of the isobutene, separating an unpolymerized, butene-containing hydrocarbon mixture from polymerized hydrocarbons so formed, contacting said unpolymerized hydrocarbon mixture with a sulfuric acid solution of a concentration between 70 and 90 per cent by weight and at a suitable temperature to convert most of the butenes in said hydrocarbon mixture to the acid sulfate esters, separating said acid sulfate solution and adding thereto a quantity of water sufficient to reduce the concentration of the acid originally used to a concentration of between 50 and 65 per cent sulfuric acid thereby diluting said acid sulfate solution, and heating said diluted acid sulfate solution to a temperature between 75 and 145° C. thereby to regenerate and separate olefins.

13. A process for preparing 2-pentene in a concentrated form, which comprises subjecting a hydrocarbon mixture containing olefins consisting principally of tertiary pentenes and other pentenes to a selective polymerization to selectively polymerize most of the tertiary pentenes, separating an unpolymerized, pentene-containing hydrocarbon mixture from polymerized hydrocarbons so formed, contacting said unpolymerized hydrocarbon mixture with a sulfuric acid solution of a concentration between 70 and 90 per cent by weight and at a suitable temperature to convert most of the pentenes in said hydrocarbon mixture to the acid sulfate esters, separating said acid sulfate solution and adding thereto a quantity of water sufficient to reduce the concentration of the acid originally used to a concentration of between 50 and 65 per cent sulfuric acid thereby diluting said acid sulfate solution, and heating said diluted acid sulfate solution to a temperature between 75 and 145° C. thereby to regenerate and separate olefins.

14. A process for preparing 2-hexene in a concentrated form, which comprises subjecting a hydrocarbon mixture containing olefins consisting principally of tertiary hexenes and other hexenes to a selective polymerization to selectively polymerize most of the tertiary hexenes, separating an unpolymerized, hexene-containing hydrocarbon mixture from polymerized hydrocarbons so formed, contacting said unpolymerized hydrocarbon mixture with a sulfuric acid solution of a concentration between 70 and 90 per cent by weight and at a suitable temperature to convert most of the hexenes in said hydrocarbon mixture to the acid sulfate esters, separating said acid sulfate solution and adding thereto a quantity of water sufficient to reduce the concentration of the acid originally used to a concentration of between 50 and 65 per cent sulfuric acid thereby diluting said acid sulfate solution, and heating said diluted acid sulfate solution to a temperature between 75 and 145° C. thereby to regenerate and separate olefins.

15. A process for preparing 2-butene in a concentrated form, which comprises subjecting a hydrocarbon mixture containing olefins consisting principally of isobutene and other butenes to a polymerization operation to form hydrocarbon polymers from most of the isobutylene, separating an unpolymerized, butene-containing hydrocarbon mixture from polymerized hydrocarbons so formed, contacting said unpolymerized hydrocarbon mixture with a sulfuric acid solution of a concentration between 70 and 90 per cent by weight and at a suitable temperature to convert most of the butenes in said hydrocarbon mixture to the acid sulfate esters, separating said acid sulfate solution and adding thereto a quantity of water sufficient to reduce the concentration of the acid originally used to a concentration of between 50 and 65 per cent sulfuric acid thereby diluting said acid sulfate solution, and heating said diluted acid sulfate solution to a temperature between 75 and 145° C. thereby to regenerate and separate olefins.

ROBERT D. SNOW.